US007000593B2

(12) United States Patent
Müller et al.

(10) Patent No.: US 7,000,593 B2
(45) Date of Patent: Feb. 21, 2006

(54) PORTABLE HANDHELD WORK APPARATUS

(75) Inventors: Matthias Müller, Remshalden (DE); Harald Schliemann, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/891,013

(22) Filed: Jul. 15, 2004

(65) Prior Publication Data

US 2005/0011491 A1 Jan. 20, 2005

(30) Foreign Application Priority Data

Jul. 16, 2003 (DE) ................................ 103 32 241

(51) Int. Cl.
*F02D 11/04* (2006.01)

(52) U.S. Cl. ...................................................... 123/398

(58) Field of Classification Search ................ 123/398, 123/400; 74/491, 501.6, 519, 523, 525, 526, 74/527, 532–533, 540

See application file for complete search history.

(56) References Cited

U.S. PATENT DOCUMENTS

| | | | | |
|---|---|---|---|---|
| 4,028,804 | A * | 6/1977 | Hammond | 30/382 |
| 4,302,880 | A * | 12/1981 | Elfving et al. | 30/382 |
| 4,438,658 | A * | 3/1984 | Carlson | 74/501.6 |
| 4,807,580 | A * | 2/1989 | Clark | 123/398 |
| 5,142,934 | A * | 9/1992 | Persson et al. | 74/502.4 |
| 5,718,052 | A | 2/1998 | Taomo et al. | 123/398 |
| 5,842,277 | A * | 12/1998 | Haberlein et al. | 30/276 |
| 5,862,713 | A * | 1/1999 | Tsunoda et al. | 74/526 |
| 6,182,524 | B1 * | 2/2001 | Nagashima | 74/501.6 |
| 6,196,082 | B1 * | 3/2001 | Iwata | 74/501.6 |
| 6,419,420 | B1 * | 7/2002 | Hedlund | 404/133.1 |
| 6,581,568 | B1 * | 6/2003 | Kramer | 123/398 |
| 6,640,444 | B1 * | 11/2003 | Harada et al. | 30/277.4 |

* cited by examiner

*Primary Examiner*—Hai Huynh
(74) *Attorney, Agent, or Firm*—Walter Ottesen

(57) ABSTRACT

A portable handheld work apparatus such as a blower or brushcutter or the like has an actuating device for controlling the drive motor of the work apparatus. A throttle lever (2) is provided which acts on the actuating device. A fixing device (35) is provided for the throttle lever (2). In order to obtain a simple, reliable fixing of the throttle lever (2), the fixing device (35) includes blocking elements which fix the throttle lever (2) in a latching position (21) of the fixing device (35) in at least one pregiven position and which enable the throttle lever (2) in the operation-disabled position (20) of the fixing device (35).

22 Claims, 3 Drawing Sheets

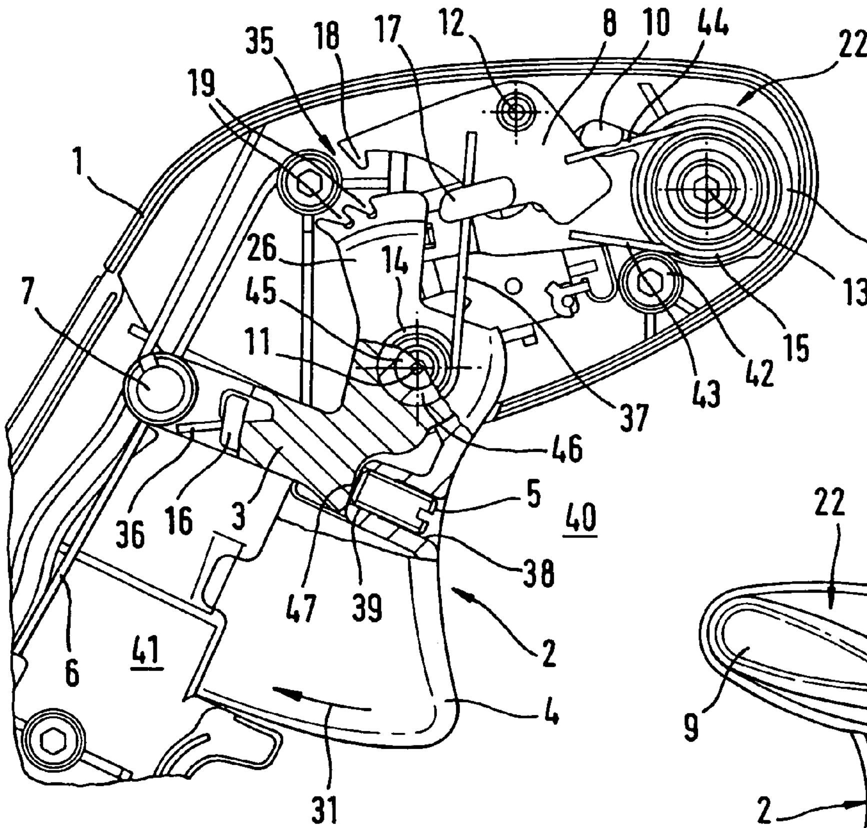
Fig. 1
Fig. 2
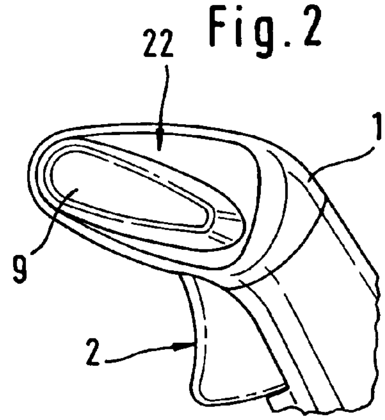
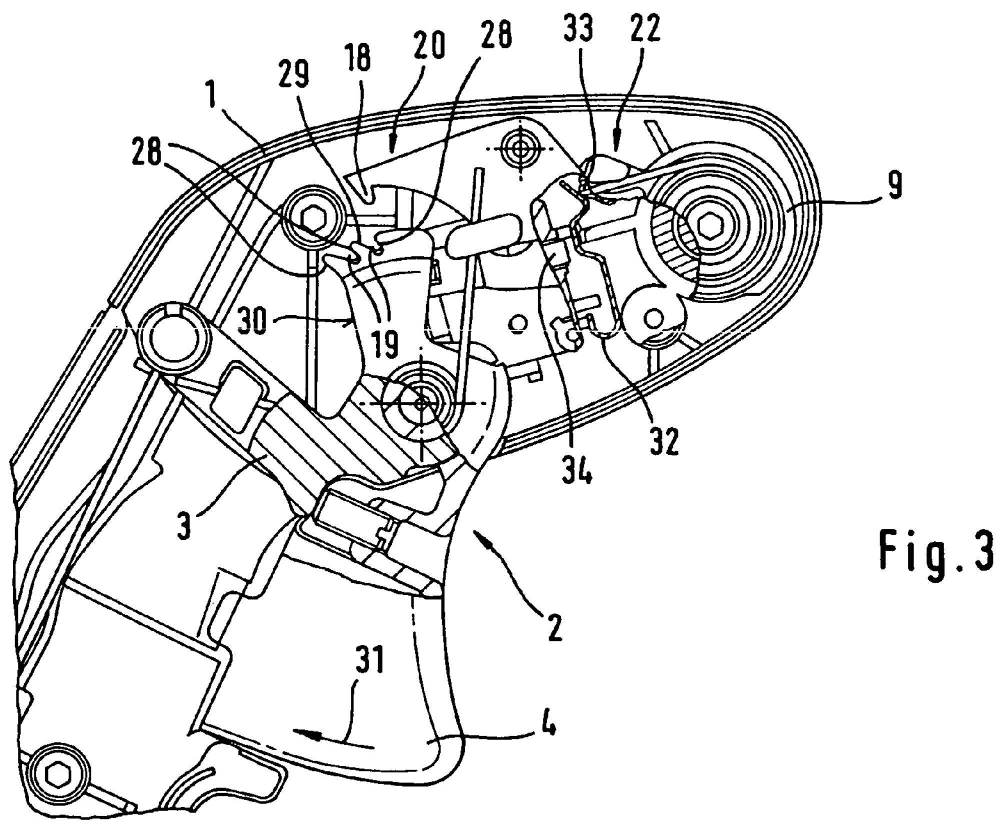
Fig. 3

Fig. 7
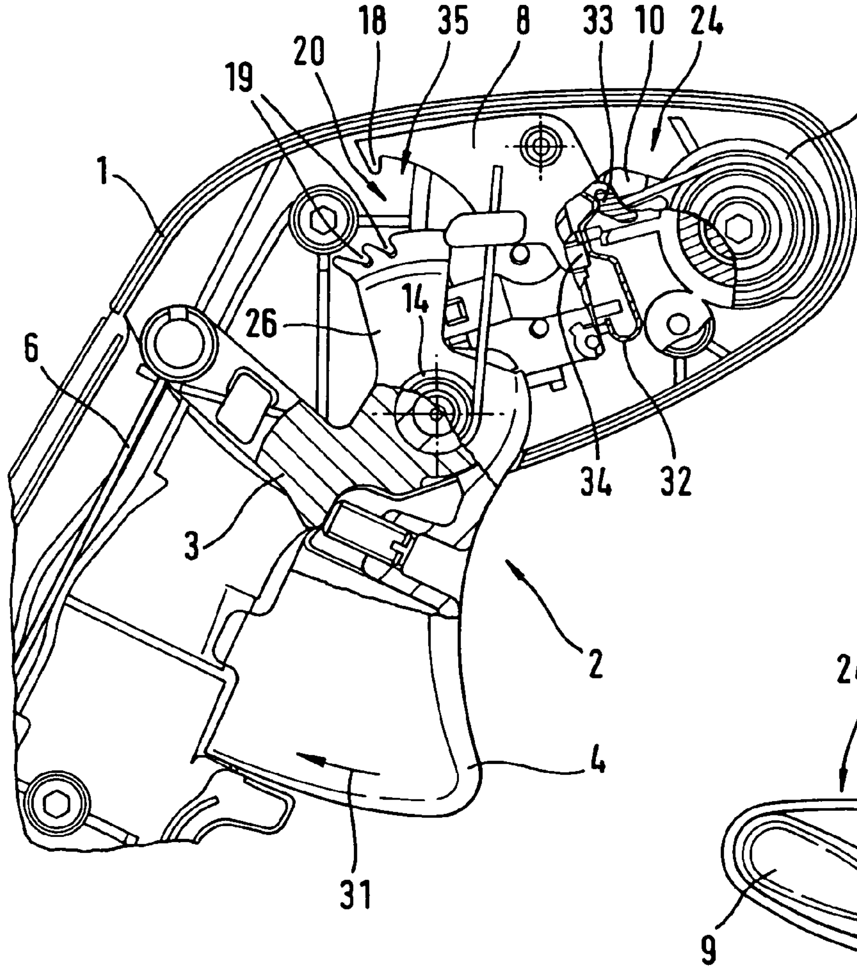
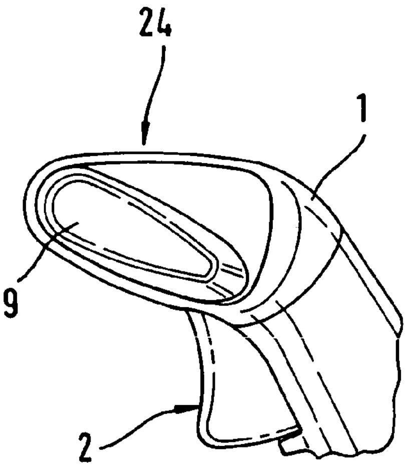
Fig. 8

PORTABLE HANDHELD WORK APPARATUS

CROSS REFERENCE TO RELATED APPLICATION

This application claims priority of German patent application no. 103 32 241.8, filed Jul. 16, 2003, the entire content of which is incorporated herein by reference.

FIELD OF THE INVENTION

The invention relates to a portable handheld work apparatus including a blower apparatus, brushcutter or the like.

BACKGROUND OF THE INVENTION

U.S. Pat. No. 5,718,052 discloses a brushcutter which includes a bowden cable for controlling the drive motor. The bowden cable can be actuated via a throttle lever. A second lever is provided for fixing the throttle lever in desired positions and this second lever tightly clamps the throttle lever via an eccentric cam arrangement. To fix the throttle lever, the operator must simultaneously hold the throttle lever in its position and actuate the second lever for fixing the throttle lever. This results in a rather awkward procedure for the operator.

SUMMARY OF THE INVENTION

It is an object of the invention to provide a work apparatus of the kind described above which is more easily operated by an operator.

The portable handheld work apparatus of the invention has a drive motor and includes: an actuating arrangement for controlling the drive motor; a throttle lever operatively connected to the actuating arrangement for acting on the actuating arrangement; a fixing device for the throttle lever; the fixing device being movable between a latching position and an operation-disabled position; and, the fixing device including at least one blocking element for fixing the throttle lever in at least one pregiven position when the fixing device is in the latching position and for enabling the throttle lever when the fixing device is in the operation-disabled position.

The fixing device can be set in the operation disabled position during the conventional operation of the work apparatus. In this position, the throttle lever is enabled and can be manipulated by the operator in the usual manner. If the throttle lever is to be fixed, the operator can place the fixing device in the latching position. In this position, the latch elements of the fixing device coact and fix the throttle lever against its operating direction as soon as the throttle lever reaches a pregiven position. The operator need not simultaneously actuate the throttle lever and the fixing device; instead, the fixing device is first placed in the latching position and, thereafter, the throttle lever is actuated which is then automatically fixed in the pregiven positions.

Advantageously, the fixing device includes a latch lever on which at least one blocking element is arranged. At least one blocking element is arranged on the throttle lever. To fix the throttle lever, a blocking element on the throttle lever cooperates with a blocking element of the latch lever. By configuring the blocking elements as latch elements, a reliable holding of the throttle lever is ensured via the latching. Advantageously, in the latching position, the latch lever lies against the throttle lever. To ensure a reliable fixing, the latch lever is resiliently biased in the direction toward the throttle lever. A simple configuration can be achieved when the latch lever is spring biased via a torsion spring which, with one leg, is braced on the latch lever and, with the other leg, is braced on the throttle lever. Accordingly, via the torsion spring, a reliable fixing by the latch lever is ensured as well as a biasing of the throttle lever in a direction toward its idle position. During the operation, the operator must therefore overcome the force of the torsion spring in order to actuate the throttle lever.

In order to ensure a reliable fixing, it is provided that the blocking element is a latch element which latches the throttle lever. Advantageously, the latch element is configured as a latch projection on the latch lever which coacts with at least one latch shoulder connected to the throttle lever. The latch elements especially define several latch positions. In the blocking position, the latch lever lies against the throttle lever. When actuating the throttle lever, the latch projection is pressed behind a latch shoulder via the force of the spring and acts together with this latch shoulder in order to fix the throttle lever. With a further actuation of the throttle lever, the latch projection is pressed away from the latch shoulder. The latch projection latches behind the next latch shoulder because of the spring biasing of the latch lever. In this way, several latch positions can be defined in a simple manner.

The fixing device includes a setting device via which the fixing device can be shifted between the latching position and the operation-disabled position. The setting device includes a position lever which coacts with a lug on the latch lever. The position lever acts especially against the spring biasing of the latch lever. With the position lever, the latch lever can therefore be brought into a position wherein the latch shoulder does not lie against the throttle lever and therefore no fixing of the throttle lever is possible. It is provided that the setting device includes an off position wherein it actuates a switch-off device for the drive motor. The switch-off device includes a contact spring to interrupt the ignition of the drive motor.

In known fixing devices for throttle levers, it is possible to fix the throttle lever in the full-load position and to switch off the drive motor in this state. If the muffler of the internal combustion engine is equipped with a catalytic converter, this can lead to the after burning of exhaust gases in the catalytic converter, which damages the catalytic converter, and can lead to an excessive warming of the exhaust gases. For a restart of the engine, the throttle lever is still in the full-load position. A starting of the drive motor is not possible in this position. In order to avoid that the drive motor can be switched off and started in the full-load position while the throttle lever is still in the full-load position, it is provided that the setting device has an operating position wherein the fixing device is in the operation-disabled position and a fixing position wherein the fixing device is in a latching position. The operating position of the setting device is arranged between the fixing position and the off position.

In order to actuate the switch-off device, the positioning device must first be shifted from the fixing position into the operating position wherein the latch lever is actuated by the position lever and the latch lever is thereby lifted off of the throttle lever. The latching of the throttle lever is thereby released. Only thereafter can the positioning device be shifted into the off position. Because of the spring forces on the actuating device of the drive motor, the throttle lever in the operating position is automatically pulled into the idle position as soon as the operator no longer actuates the throttle lever. In this way, it is ensured that the drive motor can only be started in the idle position of the throttle lever.

In conventional actuating devices, the actuating device of the drive motor must be adjusted to the position of the throttle lever. Here, it must be ensured that the drive motor is driven in idle for a non-actuated throttle lever and operates at full load for a fully-actuated throttle lever. In conventional actuating devices such as bowden cables, the length of the actuating device must be varied for this purpose. Especially in work apparatus wherein the throttle lever is mounted remote from the drive motor, the adjustment is complex. In order to simplify the adjustment of the actuating device, it is provided that the throttle lever is configured so as to be subdivided and has an operator-controlled lever for actuation by the operator and an actuating lever which operates on the actuating device. Here, the relative position of the operator-controlled lever to the actuating lever is advantageously adjustable. To adjust the relative position of the actuating lever relative to the operator-controlled lever, it is advantageous to provide a set element. The actuating device can be adjusted via the adjustment of the relative position of the actuating lever to the operator-controlled lever without it being necessary to make an adjustment on the drive motor. The actuating device can be fixedly mounted on the drive motor, especially on a throttle element in the intake channel such as a throttle flap. The adjustment can then be undertaken completely at the throttle lever.

To permit a simple adjustment and also to make possible a readjustment in a simple manner, it is provided that the throttle lever is pivotally journalled in a housing and the set element is accessible from outside of the housing. A simple configuration results when the operator-controlled lever has a bore which extends from the end of the operator-controlled lever projecting to the outer side of the housing in a direction toward the actuating lever and the set element is arranged in this bore. The set element is especially a screw. In order to ensure the relative position of the actuating lever to the operator-controlled lever during operation, it is provided that the actuating lever is spring biased in a direction toward the operator-controlled lever. In this way, the actuating lever is pressed against the operator-controlled lever for every position of the throttle lever.

BRIEF DESCRIPTION OF THE DRAWINGS

The invention will now be described with reference to the drawings wherein:

FIG. 1 is a section view of a work apparatus in the region of the throttle lever having a fixing device in the operation-disabled position;

FIG. 2 is a perspective view of the housing of a work apparatus in the region of the throttle lever and position lever with the position lever in the operating position;

FIG. 3 is a section view of a work apparatus in the region of the throttle lever with a fixing device in the operation-disabled position;

FIG. 7 is a section view of a housing of a work apparatus in the region of the throttle lever with a position lever in the off position; and, FIG. 8 is a perspective view of the housing of a work apparatus in the region of the throttle lever and position lever with the position lever in the off position.

DESCRIPTION OF THE PREFERRED EMBODIMENTS OF THE INVENTION

Figure 4:
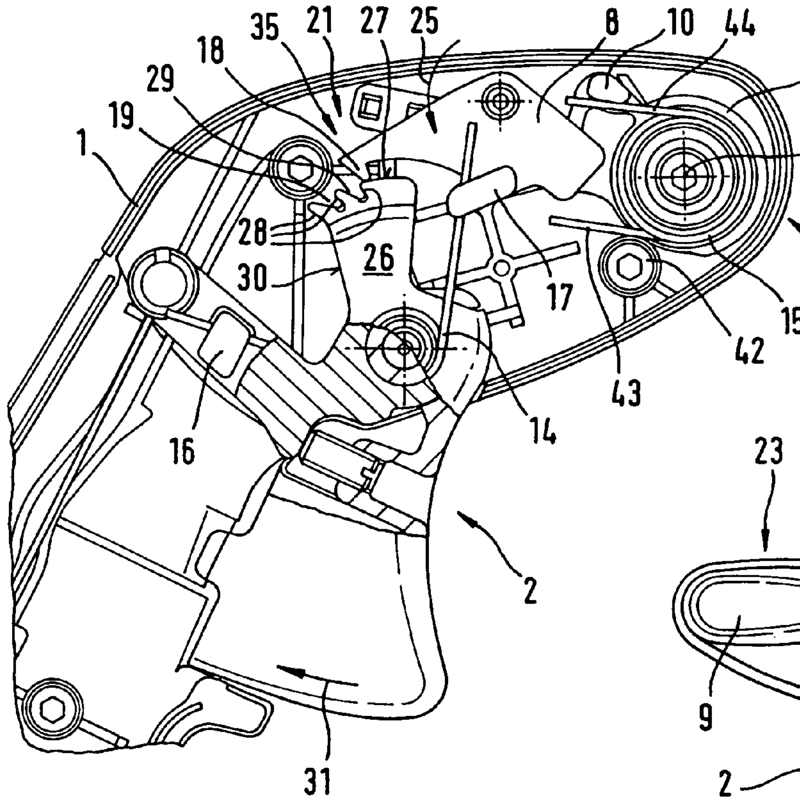
FIG. 4 is a section view of a work apparatus in the region of the throttle lever with the fixing device in the blocking position.

The housing 1 shown in section in FIG. 1 is the housing of a blower apparatus, a brushcutter or the like. In the housing 1, a throttle lever 2 is pivotally journalled on a bolt 45 about a rotational axis 11. The throttle lever 2 has an actuating lever 3 on which a bowden cable 6 is fixed at a holder 7. The throttle lever 2 includes an operator-controlled lever 4, which projects onto the outer side 40 of the housing 1 and can be actuated by an operator. The operator-controlled lever 4 has a bearing bushing 46 with which this lever is journalled on the bolt 45. On the outer periphery of the bearing bushing 46, the actuating lever 3 is likewise pivotally journalled about the rotational axis 11. The operator-controlled lever 4 has a bore 38 which extends from the side of the operator-controlled lever 4 facing toward the outer side 40 of the housing and extends through the operator-controlled lever 4 in a direction toward the actuating lever 3. The bore 38 has a thread 39 in which a screw 5 threadably engages. The screw 5 is configured as a set screw. The actuating lever is configured to have an L-shape and has an actuating point 47 in the connecting region between the two legs. The actuating lever 3 lies against the screw 5 at the actuating point 47. The point of application or actuating point 47 is at a smaller distance to the rotational axis 11 than the holder 7. By screwing the set screw 5 into the thread 39, the actuating lever 3 can be shifted relative to the operator-controlled lever 4. The holder 7 moves through a greater distance than the actuating point 47. In this way, the holder 7 is pivoted about the rotational axis 11 so that the application point on the bowden cable 6 is shifted. In this way, the bowden cable 6 can be so adjusted that the drive motor (which is controlled by the bowden cable) runs at idle in the non-actuated position of the operator-controlled lever 4 and runs at full load in a fully actuated position of the operator-controlled lever 4. The set screw 5 can be adjusted from the outer side 40 of the housing.

A section 26 is formed on the end of the operator-controlled lever 4 projecting into the housing interior 41. The section 26 extends in a direction toward a latch lever 8 which is pivotally journalled about a rotational axis 12 in the housing 1. The section 26 of the throttle lever 2 has latch recesses 19 on the end facing toward the latch lever 8. A latch projection 18 is formed on the latch lever 8 on the end facing toward the section 26. The latch projection 18 and the latch recesses 19 conjointly form a fixing device 35 for the throttle lever 2. The latch lever 8 is, with its latch projection 18, spring journalled in a direction toward the section 26 of the throttle lever 2. For this purpose, a torsion spring 14 is provided which is journalled about the rotational axis 11 on the throttle lever 2 and the first leg 36 thereof is braced on a holder 16 on the actuating lever 3 and the second leg 37 is braced on a holder 17 on the latch lever 8.

A position lever 9 is provided for actuating the fixing device 35. The position lever 9 is shown in the operating position 22 in FIGS. 1 to 3. As shown in FIG. 1, the position lever 9 includes a lug 10 which acts on the latch lever 8. The lug 10 acts on the latch lever 8 in a direction against the torsion spring 14. In the operation-disabled position 20 of the latch lever 8 shown in FIGS. 1 to 3, the latch projection 18 is at a distance to the section 26 on the throttle lever 2. The latch projection 18 cannot coact with the latch recesses 19 so that the throttle lever 2 is freely movable in the operation-disabled position 20 of the latch lever 8. The throttle lever 2 can be actuated by the operator in the actuation direction 31. By releasing the throttle lever 2, the throttle lever 2 is pressed back into the idle position shown in FIGS. 1 to 3 by the torsion spring 14 and the forces introduced by the bowden cable 6.

The position lever 9 is rotationally journalled about a rotational axis 13. The position lever 9 is spring biased by a torsion spring 15 whose first leg 43 lies on a bolt 42, which is fixed on the housing, and its second leg 44 presses against the lug 10. The torsion spring 15 operates in a direction wherein the lug 10 is lifted from the latch lever 8.

As shown in FIG. 3, the position lever 9 has an actuator 33 which acts on a contact spring 32. The contact spring 32 is mounted in spaced relationship to a contact 34 in the operating position 22 of the position lever 9 shown in FIG. 3. The ignition of the engine is not interrupted in this position of the position lever 9.

The latch recesses 19 each have a latch shoulder 28 on the edge lying in the actuation direction 31. Latch shoulders 28 are formed also on the side 30 of the latch recesses 19 facing toward the actuating lever 3. The latch projection 18 comes to rest in a latch position behind the latch shoulders 28 and so fixes the throttle lever 2. The opposite-lying wall of each latch recess 19 is configured as a back 29 with this wall lying opposite to the actuation direction 31.

Figure 5:
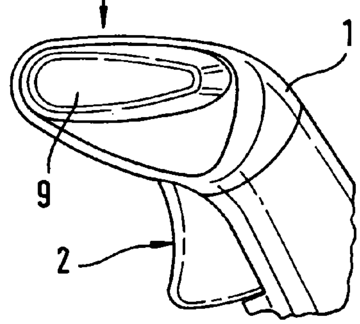
FIG. 5 is a perspective view of the housing of a work apparatus in the region of the position lever and throttle lever with the position lever in a fixing position.
Figure 6:
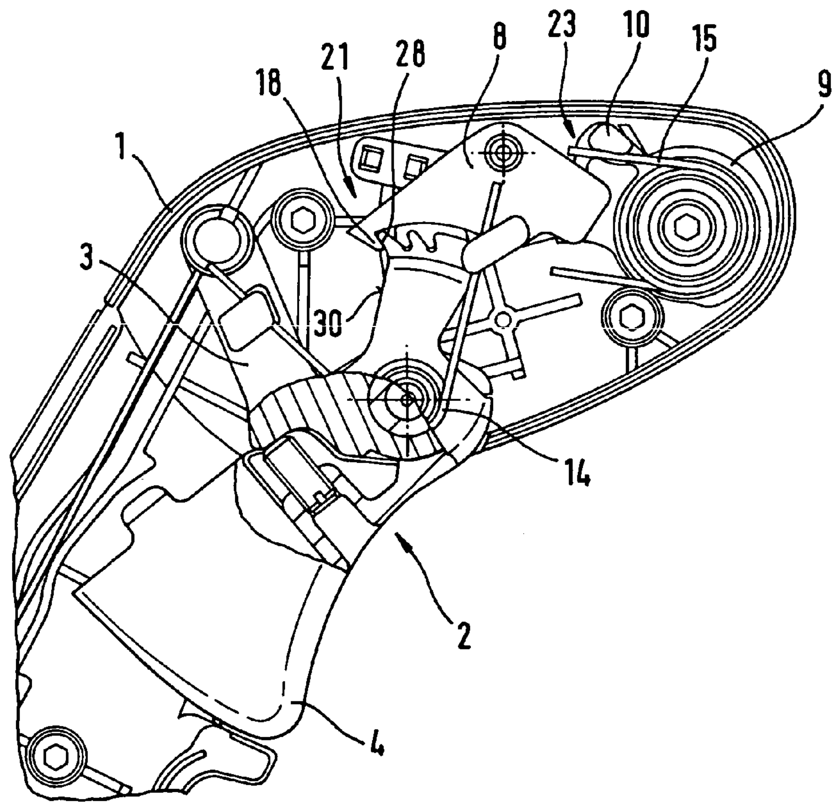
FIG. 6 is a section view of a housing of a work apparatus in the region of the throttle lever with a fixing device in the blocking position.

In FIGS. 4 to 6, the fixing device 35 is shown in the latched position 21. As shown in FIG. 5, the position lever 9 is arranged in the fixing position 23. Compared to the operating position 22 shown in FIG. 2, the position lever 9 is rotated in the counter-clockwise direction on the outer side 40 of the housing.

As shown in FIG. 4, the lug 10 is at a spacing from the latch lever 8 in the fixing position 23 of the position lever 9. The latch lever 8 is spring biased in the direction of arrow 25 by the torsion spring 14. The latch projection 18 presses against the support surface 27 on the section 26 of the throttle lever 2 because of the force of the torsion spring 14. The support surface 27 faces toward the latch lever 8. The fixing device 35 is in the latch position 21. In this position, the latch projection 18 comes into engagement with the latch shoulders 28 formed on the latch recesses 19.

In the idle position of the throttle lever 2 shown in FIG. 4, the latch projection 18 lies against the support surface 27. The throttle lever 2 is not fixed in this position. Upon actuation of the throttle lever 2 in the direction of the actuation direction 31, the latch projection 18 is pressed into the first latch recess 19 because of the force of the spring 14 and lies there against a latch shoulder 28. The latch projection 18 fixes the throttle lever 2 with the latch shoulder 28. The throttle lever 2 cannot be actuated opposite to the actuation direction 31. With a further pressing of the throttle lever 2 in the actuation direction 31, the latch projection 18 slides over the back 29, which is formed on the latch recess 19, and slips into the next latch recess 19 where it fixes the throttle lever 2 anew. With further actuation, the latch projection 18 slides along the next back 29 until it lies against the latch shoulder 28 formed on the end 30. In this position, the throttle lever 2 is in the full-load position as shown in FIG. 6.

The latch positions of the throttle lever 2 are defined by the three latch shoulders 28. The latch lever 8 is pressed against the throttle lever 2 by the torsion spring 14 so that a reliable fixing of the throttle lever 2 is ensured.

In FIGS. 7 and 8, the position lever 9 is shown in the off position 24. In order to place the position lever in the off position 24, the position lever 9 must first be placed from the fixing position 23 into the operating position 22 wherein the fixing device 35 is released and the throttle lever 2 is enabled. The position lever 9 reaches the off position shown in FIGS. 7 and 8 because of a further rotation of the position lever 9 in the clockwise direction seen from the outer side 40 of the housing. In this position, the lug 10 lies against the latch lever 8 and loads the latch lever against the position lever. The latch projection 18 is at a distance to the section 26 with the latch recesses 19 so that the throttle lever 2 is released. The actuation 33 of the position lever 9 presses the contact spring 32 against the contact 34. In this way, the ignition of the internal combustion engine is interrupted and the engine is switched off. The throttle lever 2 is in the idle position because it is loaded via the torsion spring 14 and via forces acting from the bowden cable 6 opposite to the actuation direction 31. In this way it is ensured that the internal combustion engine can only be started when the fixing device 35 is in the operator-disabled position 20, that is, when the latch projection 18 is not in engagement with the latch recesses 19 and the throttle lever 2 is enabled.

In lieu of the latch elements, other blocking elements can be provided on the latch lever 8. A clamping block can be used as a blocking element which force-tightly fixes the throttle lever and permits a fixing of the throttle lever in each position.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus including a drive motor, the work apparatus comprising:

an actuating arrangement for controlling said drive motor;

a throttle lever operatively connected to said actuating arrangement and said throttle lever being movable in an actuation direction for acting on said actuating arrangement;

a fixing device for said throttle lever;

said fixing device being movable between a latching position and an operation-disabled position;

said throttle lever being movable in said actuation direction up to a pregiven position when said fixing device is in said latching position; and, said fixing device including at least one blocking element for fixing said throttle lever in said pregiven position opposed to said actuation direction as soon as said throttle lever has reached said pregiven position when said fixing device is in said latching position and said one blocking element enabling said throttle lever when said fixing device is in said operation-disabled position.

2. The work apparatus of claim 1, wherein said fixing device includes a latch lever incorporating said at least one blocking element.

3. The work apparatus of claim 2, wherein said blocking element is a first blocking element and said throttle lever has a second blocking element arranged thereon.

4. The work apparatus of claim 3, wherein said latch lever lies against said throttle lever when said fixing device is in said latching position.

5. The work apparatus of claim 4, further comprising spring means for spring biasing said latch lever in a direction toward said throttle lever.

6. The work apparatus of claim 5, said spring means being a torsion spring having a first leg braced on said latch lever and a second leg braced on said throttle lever.

7. The work apparatus of claim 6, wherein said blocking element is a latch element for latching said throttle lever.

8. The work apparatus of claim 7, wherein said latch element is a first latch element configured as a latch projection formed on said latch lever; and, said work apparatus further comprises a second latch element in the form of a latch shoulder operatively connected to said throttle lever and said first and second latch elements coact with each other.

9. The work apparatus of claim 8, wherein said second latch element includes several latch positions.

10. The work apparatus of claim 8, further comprising a setting device for shifting said fixing device between said latching position and said operation-disabled position.

11. The work apparatus of claim 10, wherein said setting device includes a position lever having a lug for acting on said latch lever.

12. The work apparatus of claim 11, wherein said position lever counters the spring biasing of said latch lever.

13. The work apparatus of claim 10, wherein said drive motor includes a switch-off device and said setting device includes an off position in which said setting device actuates said switch-off device.

14. The work apparatus of claim 13, wherein said drive motor is an internal combustion engine and said switch-off device includes a contact spring to interrupt the ignition of said internal combustion engine.

15. The work apparatus of claim 14, wherein said setting device is movable between an operating position wherein said fixing device is in said operation-disabled position and a fixing position wherein said fixing device is in said latching position; and, said operating position of said setting device is arranged between said fixing position and said off position.

16. The work apparatus of claim 15, wherein said throttle lever is partitioned into an operator-controlled lever for manual actuation by an operator and an actuating lever which operates on said actuating arrangement.

17. The work apparatus of claim 16, wherein said throttle lever includes means for adjusting the relative position of said operator-controlled lever relative to said actuating lever.

18. The work apparatus of claim 17, said adjusting means including a set element for adjusting the position of said actuating lever relative to said operator-controlled lever.

19. The work apparatus of claim 18, wherein said work apparatus includes a housing and said throttle lever is pivotally mounted in said housing; and, said set element is accessible from outside of said housing.

20. The work apparatus of claim 19, wherein said adjusting means further includes a bore formed in said operator-controlled lever; said bore extends toward the outside of said housing in a direction toward said actuating lever; and, said set element is arranged in said bore.

21. The work apparatus of claim 20, wherein said set element is a screw.

22. The work apparatus of claim 16, wherein said work apparatus further comprises spring biasing means for spring biasing said actuating lever toward said operator-controlled lever.

* * * * *